(12) United States Patent
Ficarra

(10) Patent No.: US 10,212,173 B2
(45) Date of Patent: *Feb. 19, 2019

(54) DETERMINISTIC REPRODUCTION OF CLIENT/SERVER COMPUTER STATE OR OUTPUT SENT TO ONE OR MORE CLIENT COMPUTERS

(71) Applicant: Shape Security, Inc., Mountain View, CA (US)

(72) Inventor: Michael J. Ficarra, Sunnyvale, CA (US)

(73) Assignee: SHAPE SECURITY, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,034

(22) Filed: Mar. 12, 2018

(65) Prior Publication Data
US 2018/0205747 A1 Jul. 19, 2018

Related U.S. Application Data

(63) Continuation of application No. 15/060,322, filed on Mar. 3, 2016, now Pat. No. 9,917,850.

(51) Int. Cl.
*H04L 29/06* (2006.01)
*H04L 29/08* (2006.01)

(52) U.S. Cl.
CPC ......... *H04L 63/1408* (2013.01); *H04L 63/08* (2013.01); *H04L 63/1425* (2013.01);
(Continued)

(58) Field of Classification Search
None
See application file for complete search history.

(56) References Cited

U.S. PATENT DOCUMENTS 5,509,076 A 4/1996 Sprunk
6,654,707 B2 11/2003 Wynn
(Continued)

FOREIGN PATENT DOCUMENTS

CN 101471818 5/2011
WO WO2008/095018 8/2008
(Continued)

OTHER PUBLICATIONS

CTNF dated Aug. 29, 2018, re: Timothy Dyaln Peacock, U.S. Appl. No. 15/137,824, filed Apr. 25, 2016.
(Continued)

*Primary Examiner* — Fatoumata Traore
(74) *Attorney, Agent, or Firm* — Hickman Palermo Becker Bingham LLP

(57) ABSTRACT

Computer systems and methods for improving security or performance of one or more client computers interacting with a plurality of server computers. In an embodiment, a computer system comprises a first server computer and a second server computer; wherein the first server computer is configured to: generate a challenge nonce, wherein the challenge nonce corresponds to a challenge state; generate the challenge state based on the challenge nonce, wherein the challenge state corresponds to a response state; send, to a first client computer, the challenge nonce and the challenge state, but not the response state; wherein the second server computer is configured to: receive, from the first client computer, a test nonce and a test response state; determine whether the test response state matches the response state based on the test nonce, without: receiving the challenge state from the first server computer; receiving the challenge state from the first client computer.

38 Claims, 4 Drawing Sheets

(52) U.S. Cl.
CPC .......... *H04L 63/1441* (2013.01); *H04L 67/02* (2013.01); *H04L 67/42* (2013.01)

(56) References Cited

U.S. PATENT DOCUMENTS

| | | |
|---|---|---|
| 7,058,699 B1 | 6/2006 | Chiou |
| 7,107,347 B1 | 9/2006 | Cohen |
| 7,398,553 B1 | 7/2008 | Li |
| 7,424,720 B2 | 9/2008 | Chagoly |
| 7,464,326 B2 | 12/2008 | Kawai |
| 7,849,502 B1 | 12/2010 | Bloch et al. |
| 7,870,610 B1 | 1/2011 | Mitchell |
| 7,895,653 B2 | 2/2011 | Calo |
| 8,170,020 B2 | 5/2012 | Oliver |
| 8,195,953 B1 | 6/2012 | Yue |
| 8,453,126 B1 | 5/2013 | Ganelin |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,650,648 B2 | 2/2014 | Howard et al. |
| 8,677,481 B1 | 3/2014 | Lee |
| 8,689,330 B2 | 4/2014 | Sinn |
| 8,726,394 B2 | 5/2014 | Maor |
| 8,739,284 B1 | 5/2014 | Gardner |
| 8,752,208 B2 * | 6/2014 | Shulman ............ H04L 63/1433 713/153 |
| 8,762,962 B2 | 6/2014 | Ben-Artzi |
| 8,843,820 B1 | 9/2014 | Kay |
| 8,849,985 B1 | 9/2014 | Colton |
| 8,997,226 B1 | 3/2015 | Call |
| 9,043,924 B2 | 5/2015 | Maor |
| 9,158,893 B2 | 10/2015 | Call |
| 9,225,729 B1 | 12/2015 | Moen |
| 9,225,737 B2 | 12/2015 | Call |
| 9,258,328 B2 | 2/2016 | Ibatullin et al. |
| 9,456,050 B1 | 9/2016 | Lepeska |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,906,544 B1 | 2/2018 | Kurupati |
| 2002/0199116 A1 | 12/2002 | Hoene |
| 2004/0088651 A1 | 5/2004 | McKnight |
| 2005/0108554 A1 | 5/2005 | Rubin |
| 2005/0172338 A1 | 8/2005 | Sandu |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0053295 A1 | 3/2006 | Madhusudan |
| 2006/0101047 A1 | 5/2006 | Rice |
| 2006/0174323 A1 | 8/2006 | Brown |
| 2006/0230288 A1 | 10/2006 | Fox |
| 2006/0288418 A1 | 12/2006 | Yang |
| 2007/0011295 A1 | 1/2007 | Hansen |
| 2007/0043947 A1 * | 2/2007 | Mizikovsky ........ H04L 63/0869 713/172 |
| 2007/0064617 A1 | 3/2007 | Reves |
| 2007/0088955 A1 | 4/2007 | Lee |
| 2007/0234070 A1 | 10/2007 | Horning |
| 2008/0208785 A1 | 8/2008 | Trefler |
| 2009/0070459 A1 | 3/2009 | Cho |
| 2009/0099988 A1 | 4/2009 | Stokes |
| 2009/0199297 A1 | 8/2009 | Jarrett |
| 2009/0241174 A1 | 9/2009 | Rajan |
| 2009/0292791 A1 | 11/2009 | Livshits |
| 2010/0088404 A1 | 4/2010 | Mani |
| 2010/0106611 A1 | 4/2010 | Paulsen |
| 2010/0142382 A1 | 6/2010 | Jungck et al. |
| 2010/0186089 A1 | 7/2010 | Fu |
| 2010/0218253 A1 | 8/2010 | Andrew |
| 2010/0235637 A1 | 9/2010 | Lu |
| 2010/0235910 A1 | 9/2010 | Ku |
| 2010/0287132 A1 | 11/2010 | Hauser |
| 2011/0035733 A1 | 2/2011 | Horning |
| 2011/0154308 A1 | 6/2011 | Lobo |
| 2011/0225234 A1 | 9/2011 | Amit |
| 2011/0231305 A1 | 9/2011 | Winters |
| 2011/0320816 A1 | 12/2011 | Yao |
| 2012/0036576 A1 | 2/2012 | Iyer |
| 2012/0090030 A1 | 4/2012 | Rapaport |
| 2012/0198528 A1 | 8/2012 | Baumhof |
| 2012/0254727 A1 | 10/2012 | Jain |
| 2012/0255006 A1 | 10/2012 | Aly et al. |
| 2012/0324236 A1 | 12/2012 | Srivastava |
| 2013/0047255 A1 | 2/2013 | Dalcher |
| 2013/0086679 A1 * | 4/2013 | Beiter .................. H04L 63/08 726/22 |
| 2013/0263264 A1 | 10/2013 | Klein |
| 2013/0273882 A1 | 10/2013 | Walsh |
| 2014/0040051 A1 | 2/2014 | Ovick |
| 2014/0096194 A1 | 4/2014 | Bhogavilli |
| 2014/0208198 A1 | 7/2014 | Ayoub |
| 2014/0259145 A1 | 9/2014 | Khandelwal |
| 2014/0298469 A1 | 10/2014 | Marion |
| 2014/0304816 A1 | 10/2014 | Klein |
| 2014/0310392 A1 | 10/2014 | Ho |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1 | 4/2015 | Kaminsky |
| 2015/0262183 A1 | 9/2015 | Gervais |
| 2015/0278491 A1 | 10/2015 | Horning |
| 2015/0281263 A1 | 10/2015 | McLaughlin |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call |
| 2016/0119344 A1 | 4/2016 | Freitas Fortuna Dos Santos |
| 2016/0342793 A1 | 11/2016 | Hidayat |
| 2016/0344769 A1 | 11/2016 | Li |
| 2017/0012960 A1 | 1/2017 | Idika |
| 2017/0013012 A1 | 1/2017 | Hansen |
| 2017/0048260 A1 | 2/2017 | Peddemors |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0205747 A1 | 7/2018 | Ficarra |
| 2018/0255154 A1 | 9/2018 | Li |

FOREIGN PATENT DOCUMENTS

| | | |
|---|---|---|
| WO | WO2008/095031 | 8/2008 |
| WO | WO2008/130946 | 10/2008 |
| WO | WO2017/007705 | 1/2017 |
| WO | WO2017/007936 | 1/2017 |
| WO | WO2017/074622 | 5/2017 |

OTHER PUBLICATIONS

CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF, mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.

(56) References Cited

OTHER PUBLICATIONS

CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
CTNF, mailed on May 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA, mailed on Dec. 24, 2014, re: Justin Call, U.S. Appl. No. 14/255,248, filed Apr. 17, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. Appl. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on Mar. 17, 2016, re: Justin Call, U.S. Appl. No. 14/672,879, filed Mar. 30, 2015.
CTNF, mailed on Nov. 10, 2016, re: Nwokedi Idika, U.S. Appl. No. 14/728,621, filed Jun. 2, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oct. 19, 2017, re: Jarrod S. Overson, U.S. Appl. No. 15/059,080, filed Mar. 2, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 14/718,736, filed Mar. 27, 2017.
CTFR, mailed on Jan. 25, 2018, re: Siying yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
CTNF, dated Feb. 1, 2018, re: Nwokedi Idika, U.S. Appl. No. 15/204,710, filed Jul. 7, 2007.
NOA, dated Aug. 13, 2018, re: Daniel G. Moen, U.S. Appl. No. 14/980,231, filed Dec. 28, 2015.
NOA, dated Sep. 5, 2018, re: Daniel G. Moen, U.S. Appl. No. 14/980,231, filed Dec. 28, 2015.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 7, 2016.
CTNF, dated Sep. 19, 2018, re: Eli Mattson, U.S. Appl. No. 15/430,224, filed Feb. 10, 2017.
CTFR, dated Sep. 11, 2018, re: Michael J. Ficarra, U.S. Appl. No. 15/060,380, file Mar. 3, 2016.

(56) References Cited

OTHER PUBLICATIONS

CTFR, dated Nov. 1, 2018, re: Marc. R. Hansen, U.S. Appl. No. 15/202,755, filed Jul. 6, 2016.

* cited by examiner

DETERMINISTIC REPRODUCTION OF CLIENT/SERVER COMPUTER STATE OR OUTPUT SENT TO ONE OR MORE CLIENT COMPUTERS

CROSS-REFERENCE TO RELATED APPLICATIONS; BENEFIT CLAIM

This application claims the benefit as a Continuation of U.S. patent application Ser. No. 15/060,322, filed Mar. 3, 2016, now U.S. Pat. No. 9,917,850, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques for client/server computer systems, and relates more specifically to techniques for server computer(s) to deterministically adding or transforming data sent to a client computer, and validating one or more requests from the client computer based on the added or transformed data, without the server computer(s) persistently storing the transformed data. SUGGESTED GROUP ART UNIT: 2436.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer applications that may request and execute instructions received from a web server to generate and present complex user interfaces to a user through one or more devices, such as a monitor or speakers. In response to input from a user, such as a mouse click indicating that the user selected an object defined in the instructions, such as a link, a browser may send a request based on the selected object to the web server. The request may be a request for data or include data for the web server to process.

Attackers may use software, often referred to as a "bot", which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private or proprietary data, such as who is connected with whom on a particular social networking web site.

One way that a web server administrator may protect a server computer from attacks is to have the server computer modify a web page each time a client computer requests the web page. For each instance of the modified web page, the server computer may generate and store a set of mappings that map one or more values in the instance of modified web page to the original values in the web page. In response to a request based on an instance of the modified web page, the server computer may retrieve the set of mappings for that particular instance of the modified web page, generate a new request based on the received the request and the retrieved set of mappings, and send the new request to a server to be processed. A server that serves millions or even billions of modified instances of a web page may require a massive amount of storage to save the mappings that would be generated. Such a system may require too much memory for this to be a viable solution.

Additionally or alternatively, a web server administrator may protect a server computer from attacks by having the server computer add instructions that implement one or more countermeasures from a set of countermeasures. The one or more countermeasures may require additional processing or change the way a browser processes or executes the instructions in the web page. Accordingly, for each instance of the modified web page, the server computer may add different instructions that implement different countermeasures, each of which may change the way a web page process or executes the instance of the web page. However, adding instructions that implement one or more countermeasures may break the functionality of a web page or introduce one or more errors. To debug one or more particular countermeasures, or errors introduced into a particular instance of the web page, the server may save each instance of the web page so that a developer can review the instructions for each instance of the web page. A server that serves millions or even billions of modified instances of a web page may require a massive amount of storage to save a copy of each instance of the web page. Such a system may require too much memory for this to be a viable solution.

SUMMARY

The appended claims may serve as a summary of the invention.

Figure 1:
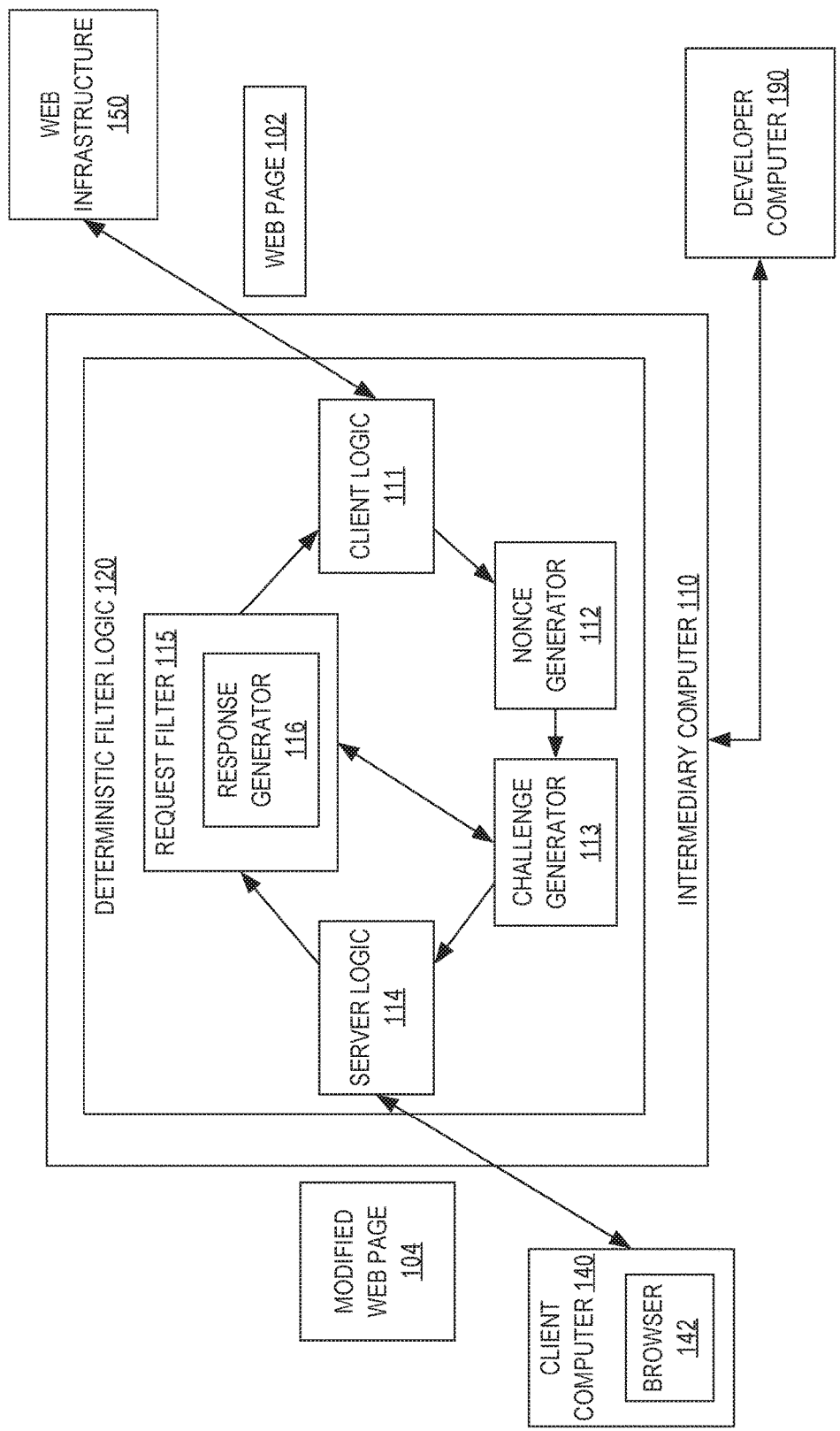
FIG. 1 illustrates an intermediary server computer that deterministically generates or modifies an instance of a web page in an example embodiment.
Figure 2:
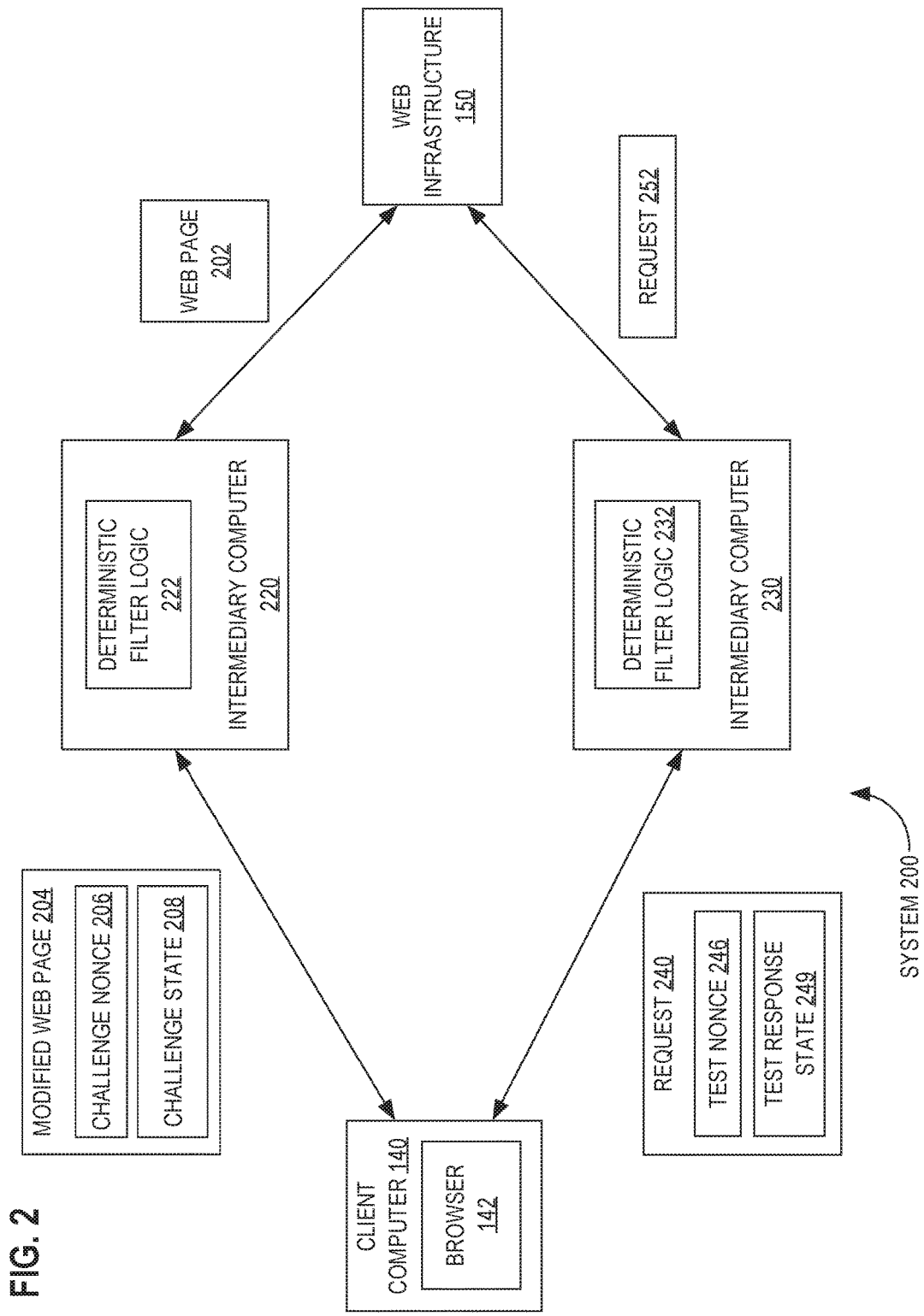
FIG. 2 illustrates a computer system comprising a web infrastructure, and two intermediary computers, which may be configured to deterministically generate or modify one or more web pages, and receive requests based on the modified web pages from one or more client computers, in an example embodiment.
Figure 3:
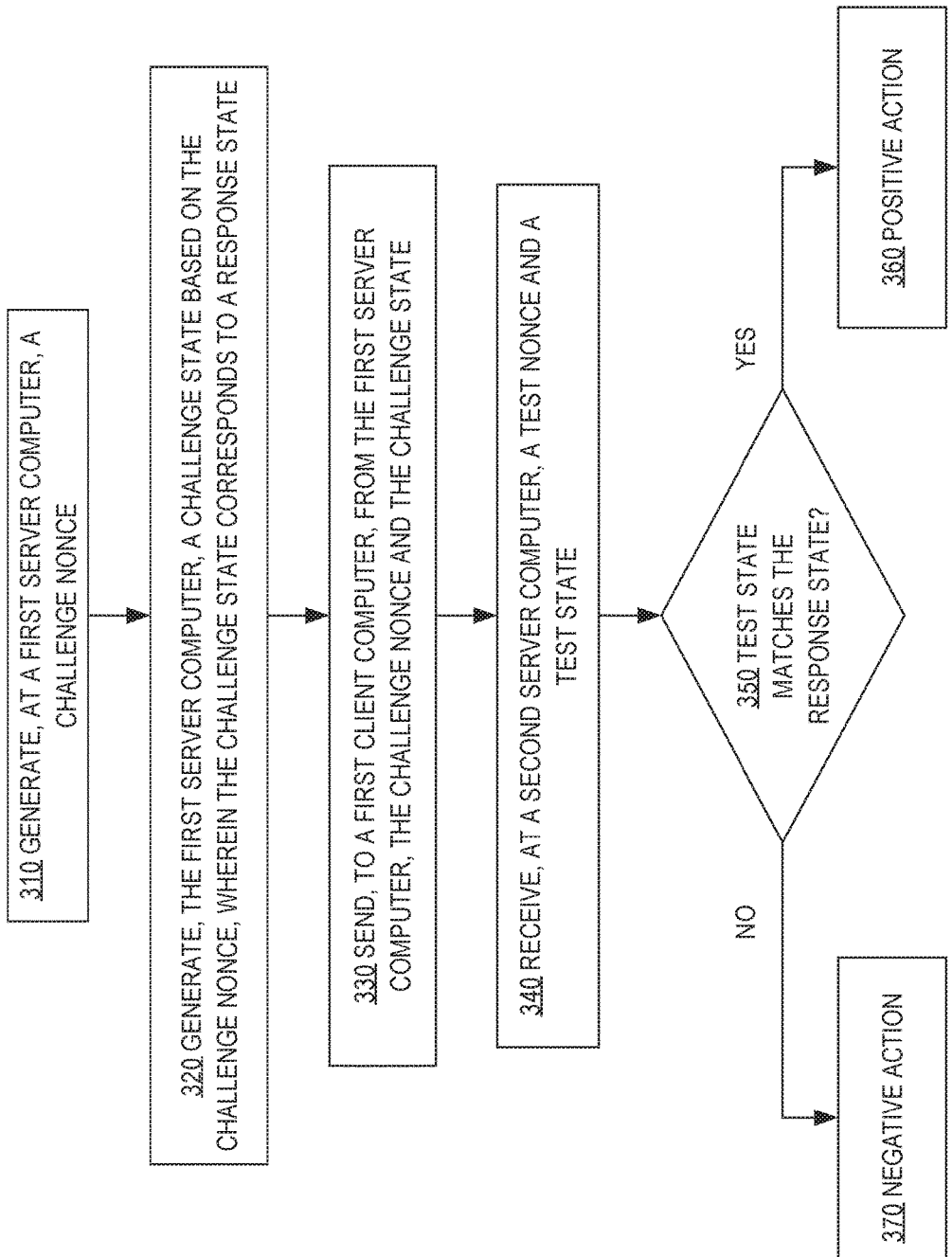
FIG. 3 illustrates a process for a first server computer deterministically generating a web page, and a second server computer processing a request that was generated based on the web page without the first server computer sending data directly to the second server computer or persistently storing data related to the web page, in an example embodiment.
Figure 4:
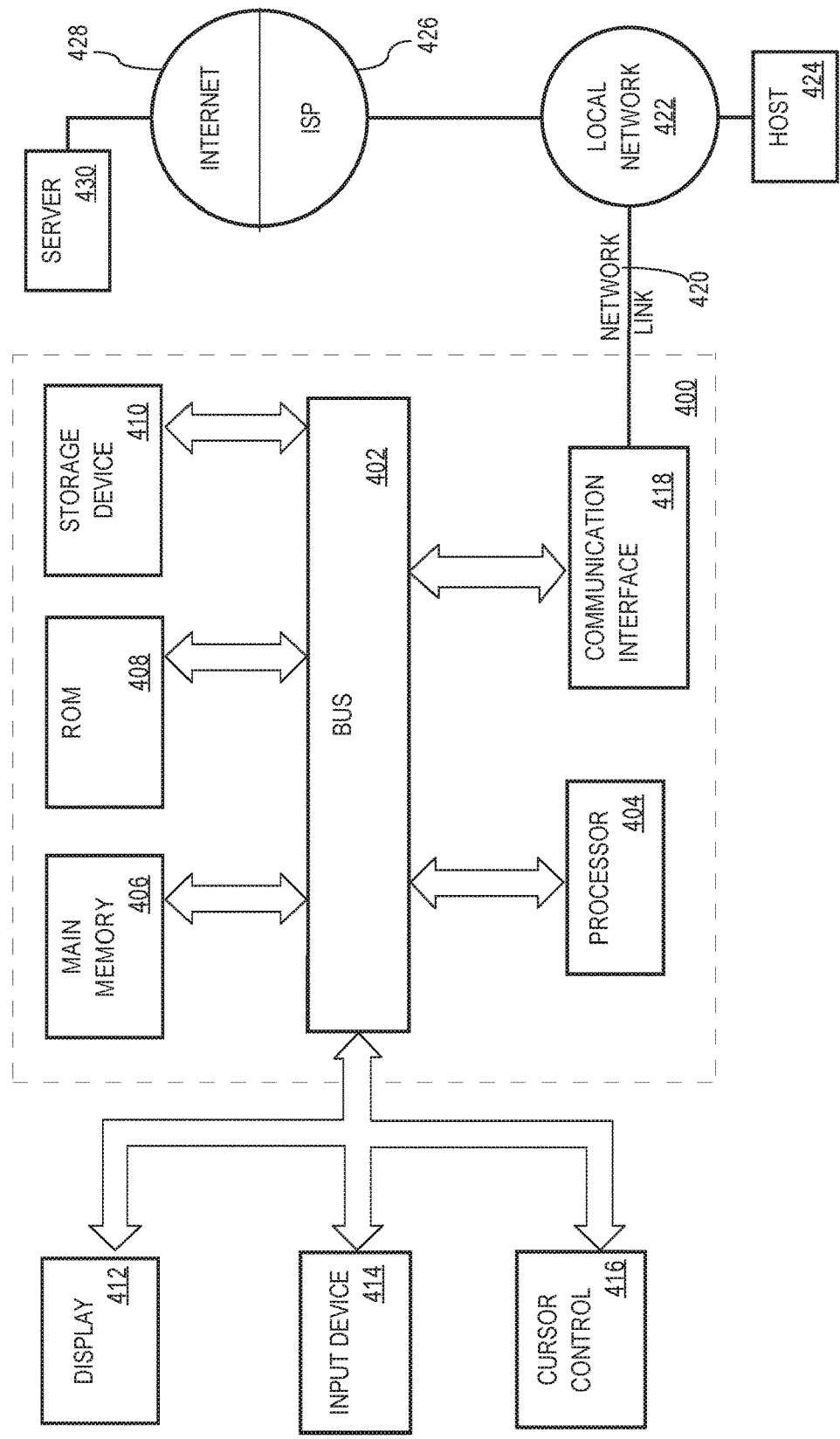
FIG. 4 is a block diagram that illustrates a computer system 500 upon which an embodiment of the invention may be implemented.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 110 in FIG. 1 may be described with reference to several components illustrated in FIG. 2 and steps in FIG. 3 and discussed in detail below, but using the particular arrangement illustrated in FIG. 1, 2, or 3 is not required in other embodiments. Furthermore, while the instructions discussed in many example embodiments are HyperText Markup Language ("HTML") and JavaScript instructions, in other embodiments, the instructions intercepted and generated may be any other standard or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise.

Embodiments are described herein according to the following outline:

1.0 General Overview
2.0 Difficulties Using Non-Deterministic Processes to Modify a Web Page
3.0 Deterministic Computer Processes—Challenge Nonces, Challenge States, and Response States
  3.1 Benefits of Using a Deterministic Approach to Modify a Web Page
  3.2 Implementing a Deterministic Approach—Example Network Topology for a Single Server Computer
    3.2.1 Details Related Network Topology Configuration
  3.3 Example Deterministic Process Implemented on a Single Server Computer
  3.4 Recreating the State of the Server Computer
  3.5 Validating the Challenge Nonce
4.0 Example Multi-Intermediary Computer Network Deterministically Modifying Web Pages and Validating Responses
5.0 Example Deterministic Processes Implemented on Multiple Server Computers
6.0 Implementation Mechanisms—Hardware Overview
7.0 Other Aspects of Disclosure

1.0 General Overview

In an embodiment, a computer system comprises a first server computer and a second server computer; wherein the first server computer is configured to: generate a challenge nonce, wherein the challenge nonce corresponds to a challenge state; generate the challenge state based on the challenge nonce, wherein the challenge state corresponds to a response state; send, to a first client computer, the challenge nonce and the challenge state, but not the response state; wherein the second server computer is configured to: receive, from the first client computer, a test nonce and a test response state; determine whether the test response state matches the response state based on the test nonce, without: receiving the challenge state from the first server computer; receiving the challenge state from the first client computer.

In an embodiment, wherein: the first server computer does not persistently store the challenge nonce; the first server computer does not persistently store the challenge state; and the first server computer does not generate the response state.

In an embodiment, wherein the challenge nonce matches the test nonce, and the second server computer is configured to: generate the challenge state based on the test nonce; generate the response state based on the challenge state.

In an embodiment, wherein the second server computer is configured to perform a positive action in response to determining that the test response state matches the response state.

In an embodiment, wherein the test nonce does not match the challenge nonce, and wherein the second server computer is configured to: generate an expected challenge state based on the test nonce; generate an expected response state based on the expected challenge state; determine that the expected response state is different than the response state, and in response, determine that the test response state does not match the response state.

In an embodiment, wherein the second server computer is configured to perform a negative action in response to determining that the test response state does not match the response state.

In an embodiment, wherein the challenge state comprises a set of instructions, which when executed produces the response state.

In an embodiment, wherein a third server computer is configured to: receive, from the first client computer, an error message that includes the test nonce, wherein the test nonce is the challenge nonce; store the error message with the test nonce; receive, from a second client computer, a request for the error message and the set of instructions sent to the first client computer that caused the first client computer to send the error message, and in response, generate the set of instructions based on the test nonce, and send the set of instructions to the second client computer.

In an embodiment, wherein the first server computer and the second server computer are configured to, for each unique nonce, among a set of unique nonces: generate a unique challenge state comprising a unique set of instructions that define one or more unique functions, which when executed, causes the one or more unique functions to generate a unique response state.

In an embodiment, wherein, for each unique nonce among the set of unique nonces, the unique response state is a unique stack trace based on the one or more unique functions.

In an embodiment, a computer system comprises a plurality of computers coupled to one or more non-transitory computer readable media storing a set of instructions which, when executed by the plurality of computers, causes: a first computer to: generate a challenge nonce, wherein the challenge nonce corresponds to a challenge state; generate the challenge state based on the challenge nonce, wherein the challenge state corresponds to a response state; send, to a first client computer, the challenge nonce and the challenge state, but not the response state; a second computer to: receive, from the first client computer, a test nonce and a test response state; determine whether the test response state matches the response state based on the test nonce, without: receiving the challenge state from the first computer; receiving the challenge state from the first client computer.

In an embodiment, a method comprises generating, at a first server computer, a challenge nonce, wherein the challenge nonce corresponds to a challenge state; generating, at the first server computer, the challenge state based on the challenge nonce, wherein the challenge state corresponds to a response state; sending, from the first server computer, to a first client computer, the challenge nonce and the challenge state, but not the response state; receiving, at a second server computer, from the first client computer, a test nonce and a test response state; determining, at the second server computer, whether the test response state matches the response state based on the test nonce, without: receiving the challenge state from the first server computer; receiving the challenge state from the first client computer.

In an embodiment, a method comprises: generating, at a server computer, a challenge nonce, wherein the challenge nonce corresponds to a challenge state; generating, at the server computer, the challenge state based on the challenge nonce, wherein the challenge state corresponds to a response state; sending, from the server computer, to a first client computer, the challenge nonce and the challenge state, but not the response state; receiving, at the server computer, from the first client computer, a test nonce and a test response state; determining, at the server computer, whether the test response state matches the response state based on the test nonce, without: the server computer persistently storing the challenge nonce; the server computer persistently storing the challenge state.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

For convenience of expression, a set of instructions may be referred to herein as a file or web page. A set of instructions, file, or web page need not have a particular type or extension, and need not be stored in persistent storage. For example, a web page may be generated dynamically based on one or more parameters. While some files may be identified as a particular type of file, such as an "HTML file" or "JavaScript file", a file may include mixed content. For example, an HTML file may include HTML, JavaScript, Cascading Style Sheets ("CSS"), or any other standard or proprietary set of instructions. Furthermore, a file need not be a file stored in persistent storage.

A server computer may be a computer that receives requests for data and responds with data. For example, a web server computer may be an HTTP-based computer that receives HTTP requests and responds with data comprising HTML or JavaScript instructions. Additionally or alternatively, a server computer may respond with data that references data on other server computers in, or outside of, a particular domain.

2.0 Difficulties Using Non-Deterministic Processes to Modify a Web Page

Embodiments discussed herein provide numerous benefits and improvements over the general idea of increasing the resistance of browsers and server computers to computer attacks and optimizing code. A server computer may embed many different types of countermeasures into a web page to prevent malicious users from gaining unauthorized access to data or automating attacks. Additionally or alternatively, a server computer may employ one or more techniques to optimize code in a web page. For example, for a first instance of a web page, a server computer may change the value of one or more first object identifiers to one or more first modified object identifiers, insert a first set of instructions that monitor and filter calls to one or more first functions, or apply code obfuscation using one or more first protocols. For a second instance of the web page, the server computer may change the value of one or more second object identifiers to one or more second modified object identifiers, insert a second set of instructions that monitor and filter calls to one or more second functions, or apply code obfuscation using one or more second protocols. The one or more first identifiers in the first instance may be different than the one or more second identifiers in the second instance; and, the one or more first modified object identifiers in the first instance may be different than the one or more second modified object identifiers in the second instance. The first set of instructions that monitor and filter calls to one or more first functions in the first instance may be different than the second set of instructions that monitor and filter calls to one or more second functions in the second instance. The one or more first protocols may be different from one or more second protocols in the second instance.

Adding countermeasures, making optimizations, or making one or more other modifications to a web page may be invasive and, among other things, break the functionality of the web page. For example, a security program, library, module, application, or other software or hardware logic executed on a server computer may be configured to change object identifiers in a web page. However, some changes may break the functionality of the web page. Developers that create and maintain the security program may need reproduce errors that arise in one or more instances of one or more web pages. However, an error in may arise infrequently, which may make the error difficult to reproduce and debug. For purposes of illustrating a clear example, assume the following:

A web page defines a form object using the following code:
<form name='search'> . . . </form>
A first instance of a security program is being executed on a first computer;
The first instance of the security program is configured to change the name of a form object for all instances of a web page that are about to be served to a client computer;
The first instance of the security program changes the name of the form object in a first instance of the web page, such that the form object is defined in the first instance using the following code:
<form name='387928352'> . . . </form>
The first instance of the security program stores a first mapping between "search" and "387928352";
The first instance of the security program changes the name of the form object in a second instance of the web page, such that the form object is defined in the second instance using the following code:
<form name='6'1832'> . . . </form>
The first instance of the security program stores a mapping between "search" and "6'1832";

The first instance of the web page is sent to a first browser;
The second instance of the web page is sent to a second browser;
The first browser sends a request that includes the modified form object name ("387928352") in the first instance of the web page;
In response to receiving the request, the first instance of the security program finds the first mapping based on the modified form object name and replaces the modified form object name with the original form object name ("search") and forwards the request to the server computer;
The second browser interprets the name of the form to be "6" rather than "6'1832";
The second browser sends a request that includes "6" as the modified form object name in the second instance of the web page;
In response to receiving the request, the first instance of the security program cannot find a mapping from "6" to the original form object name ("search");
The first instance of the security program may forward the request to the web server, but the request may use the unintended name of the modified form object ("6") instead of original form object name ("search"). This error may go completely unnoticed. Additionally or alternatively, the first instance of the security program, the web server, or some other component mail fail. In response, the first instance of the security program may append an error in a log file indicating that it could not find a mapping from "6" to any other field name.

Several issues arise using this method; the following are just a few. Storing a mapping for each modification will require a massive amount of memory and may not be a feasible solution. If a second instance of the security software program on a second computer receives the first request and the first computer and the second computer do not have shared memory or some other way from the second computer to receive data from the first computer, then the second instance of the security software program may not have access to the mappings stored on the first computer. Furthermore, even if an error is logged, nothing in the error message tells the developer why or how the error arose. Reproducing this error may be difficult because the security program may infrequently replace the name of an object with a string of characters that include an escape character.

Many security or optimization operations require much more pervasive and interdependent modifications between files, libraries, or other resources that may be part of a web page. To debug errors that may arise, a developer may need access to the entire compiled web page. One solution is to bundle the entire web page into a request from a client computer to a server computer, so that if a security program receives a request that causes an error to arise, then the web page can be stored in the log and the developer can review the web page. However, that solution may not be feasible because the bandwidth and storage required for each request may be too expensive. Another solution could be to save each instance of each web page. However, that solution may not be feasible because the amount of memory or storage required to store each instance of each web page may be too expensive. Furthermore, determine which instances of a web page had an error, and what those errors were, may be difficult.

3.0 Deterministic Computer Processes—Challenge Nonces, Challenge States, and Response States A deterministic process is a process that generates the same output for the same input. For example, a process that adds 20 to any number given as input is a deterministic process. If 10 is the input, then this deterministic process will produce 30 as the result. This deterministic process will always return 30 if 10 is the input.

A more complex deterministic process may be a process that generates data or instructions, which when used, processed, or executed deterministically produce another result. For convenience of expression, a complex deterministic process may be referred to as a challenge generator, the data or instructions generated by the challenge generator may be referred to as the challenge state. The deterministic result of using, processing, or executing the challenge state may be referred to as the response state. One or more software or hardware component(s) that use, process, or execute a challenge state may be referred to as a response generator.

A response generator can generate different response states, but a response generator will produce the same response state for the same challenge state. Similarly, a challenge generator can generate different challenge states, but the challenge generator will produce the same challenge state for the same input. The input to the challenge generator may be referred to as a challenge nonce.

Each generator nonce, of all the possible generator nonces, corresponds with a particular challenge state for a particular challenge generator. Each generator state, of all the possible generator states, corresponds to a particular response state for a particular response generator. Accordingly, for a particular challenge generator and a particular response generator, each generator nonce, of all the possible generator nonces, corresponds to a particular response state.

3.1 Benefits of Using a Deterministic Approach to Modify a Web Page

Among other benefits discussed in detail further herein, a server computer, or software on a server computer, that generates or modifies an instance of a web page using a deterministic approach can reproduce the instance of the web page, or a portion of the web page, if the server computer has the same input. Errors generated from requests that were previously difficult to detect can be substantially easier to detect. Furthermore, a developer can reproduce the entire instance of the web page, or a portion of the web page, that caused the error. Further still, data or data structures generated by the server computer, or the state of the software or hardware components on the server computer, when the web page, or portion of the web page, was created or modified, can be reproduced. The web page, portion of the web page, data, data structures, or states can be reproduced on a different computer, such as a developer's desktop computer. A first server in a plurality of server computers can generate or modify one or more instances of a web page, and a second server computer in the plurality of server computers can receive and validate requests based on those instances, but the first server computer need not persistently store those instances or send those instances to the second computer.

3.2 Implementing a Deterministic Approach—Example Network Topology for a Single Server Computer FIG. 1 illustrates an intermediary server computer that deterministically generates or modifies an instance of a web page in an example embodiment. Intermediary computer 110 may be an intermediary that may receive web pages sent from web infrastructure 150, deterministically modify the web pages, and send the modified web pages to a client computer. For example, intermediary computer 110 may receive web page 102, generate modified web page 104, and send modified web page 104 to browser 142 on client computer 140. Additionally or alternatively, intermediary computer 110 may receive requests based on modified web pages, validate the requests, modify the requests if needed, and forward the requests to one or more server computers in web infrastructure 150.

Intermediary computer 110 comprises deterministic filter logic 120, which comprises client logic 111, nonce generator 112, challenge generator 113, server logic 124, request filter 115, and response generator 116. Each of the components are discussed in detail further herein. While some of the components listed above is illustrated as if running on a single computer from each other, one or more of the components may be part of, or executed on, one or more other computers. For example, request filter 115 may be executed on a first computer that is operably coupled to a second computer that is executing nonce generator 112 or challenge generator 113.

Web infrastructure 150 may comprise one or more server computers that receive requests for data from users through one or more client computers, such as client computer 140 or intermediary computer 110. Web infrastructure 150 may respond by sending web pages or other data to the browser that sent the request. The one or more computers in web infrastructure 150 may, but need not, be owned or managed by one or more independent entities and may span across one or more computer networks, such as the Internet.

3.2.1 Details Related Network Topology Configuration

Intermediary computer 110 may be a proxy server or layer for web infrastructure 150. Additionally or alternatively, intermediary computer 110 may be in line between a router and web infrastructure 150, such that intermediary computer 110 may intercept all network data sent to, or sent from, web infrastructure 150 over one or more protocols. Additionally or alternatively, intermediary computer 110, or one or more modules or logic comprising intermediary computer 110 discussed herein, may be a software layer between, or executed on, web infrastructure 150 or a component or server computer of web infrastructure 150. Additionally or alternatively, intermediary computer 110, or one or more modules or logic comprising intermediary computer 110 discussed herein, may be part of a server-side application that responds to requests over one or more standard or proprietary protocols, such as Hypertext Transfer Protocol ("HTTP") or any other protocol.

Intermediary computer 110 may be a server computer that one or more domain name servers or other elements of the domain name system ("DNS") identify in DNS records as a destination network address associated with one or more internet domain names. Accordingly, intermediary computer 110 may receive requests sent to the one or more domains. Based on using DNS to resolve the domain name in a request to a network address, intermediary computer 110 may forward the request, or a modified request, to a server computer in web infrastructure 210.

3.3 Example Deterministic Process Implemented on a Single Server Computer

Intermediary computer 110, or one or more of the components in intermediary computer 100, may receive web page 102 from web infrastructure 150, deterministically modify web page 102 to produce modified web page 104, and validate one or more requests from browser 132 on client computer 140 based on modified web page 104. For purposes of illustrating a clear example, assume the following:

Web page 102 is an instance of a web page comprising set of one or more instructions that define a form object using the following code:

<form name='search'> . . . </form>

Client logic 111 receives web page 102 from web infrastructure 150.

Nonce generator 112 generates or selects a challenge nonce. For example, nonce generator 112 may comprise a pseudorandom number generator that generates or selects a nonce from a range of nonces based on an arbitrary seed, such as number of second since epoch according to the state of the system clock in intermediary computer 110. The pseudorandom number generator may be an independent function, and have one or more particular statistical properties, such as selecting a nonce from the range of nonces according to a uniform distribution.

Challenge generator 113 deterministically generates a challenge state based on the challenge nonce. For purposes of illustrating a clear example, assume the following:

The challenge state comprises a new form name "6'1832" and one or more JavaScript instructions which when processed or executed cause a client computer to set the name of the form object in web page 102 to be the new form name, and to generate a request that includes a response state and the challenge nonce;

The response state comprises the new form name, which is this example is "6'1832".

Challenge generator 113 generates modified web page 104 by adding the challenge state to web page 102. Challenge generator 113 sends modified web page 102 to browser 142 on client computer 140 through server logic 124.

Intermediary computer 110 may receive a request with a test nonce and a test response state, determine whether the test response state matches the response state that corresponds with the challenge nonce, and respond accordingly. For purposes of illustrating a clear example, assume the following:

Server logic 124 receives a request that includes a test nonce and a test response state The test nonce is the challenge nonce generated above;

The test response state includes data indicating that the name of the modified form object is "6".

Server logic 114 may forward the request to request filter 115. Request filter 115 may provide the test nonce to challenge generator 113 to generate an expected challenge state. Request filter 115 may compare the expected response state to the test response state. If the expected response state matches the test response state, then request filter 115 may determine that the challenge state in modified web page 104 was correctly processed or executed by client computer 140 or browser 142, or that the test response state matches the response state that the challenge state corresponds to; in response, request filter 115 may perform a positive action (discussed further herein). If the expected response state does not match the test response state, then request filter 115 may determine that the challenge state in modified web page 104 was not correctly processed or executed, or that the test response state does not match the response state that the challenge state corresponds to; in response, request filter 115 may perform a negative action (discussed further herein). Continuing with the previous example, assume the following:

The test nonce is the challenge nonce, so the expected challenge state will be the challenge state generated earlier in this example;

Response generator 116 generates the expected response state, which includes data indicating that a value in the request should have been the new name of the form object in the challenge state, which in this example is "6'1832".

In this example, however, request filter 115 compares the value in the expected response state ("6'1832") with the value of the form in the request ("6") and determines that the expected response state does not match the test response state, and therefore, the test response state does not match the response state that corresponds challenge state in this example. Accordingly, request filter 115 may determine that client computer, or browser on the client computer, did not correctly process or execute the instructions in the challenge state, and perform a negative action.

A negative action may comprise one or more actions, such as terminating the request or adding the test nonce to an error log. Continuing with the previous example, request filter 115 may perform one or more of the following negative actions: terminate the request without forwarding the request to web infrastructure 150, store the test nonce and an identifier for web page 102 in the request in an error log, notify a user that a browser submitted a request with a test nonce and a test response state, but the test nonce did not correspond with the test response state, the test response state did not match the correct response state (the expected test response state), or the test response state did not match the response state that corresponds with the test nonce (assuming the test nonce was a valid challenge nonce).

A positive action may comprise one or more actions. For example, if the test response state matched the expected response state, then request filter 115 may forward the validated response to a server computer in web infrastructure 150. Additionally or alternatively, one or more values in the request may be replaced by one or more values in the response state. For example, challenge generator 113 may be configured to add the original name of the form to challenge state, and include one or more instructions that cause the original name included in the corresponding response state. Accordingly, request filter 115 may replace the modified from name in the request with the original name from the corresponding response state, and forward the request to web infrastructure 150 through client logic 111.

3.4 Recreating the State of the Server Computer

A user, such as a developer for challenge generator 113 and response generator 116 may review the error log. The developer may cause challenge generator 113 to generate modified web page 104 based on web page 102 and the challenge nonce (or test nonce from the client computer). Upon review of the new name for the form in modified web page 104, the developer may notice that challenge generator 113 is generating a new name that includes an escape character ("'"), which will cause a client computer or browser to process or execute the challenge state incorrectly. The developer may modify challenge generator 113 so that challenge generator 113 will not generate new names with a single quote ("'") or one or more other escape characters.

The developer in this example need not use intermediary computer 110 to create modified web page 104, or the challenge state that corresponds to the challenge nonce in the log file. The developer could execute a copy of challenge generator 113 or deterministic filter logic 120 on the developer's personal computer (illustrated as in FIG. 1 as developer computer 190) and provide web page 102 and the challenge nonce (or test nonce in the log file) as input. In response, challenge generator 113, which is executing on the developer computer 190, would produce modified web page 104. The developer could review the state of challenge generator 113 as challenge generator 113 is executing on developer computer 190.

In the example above, challenge generator 113 generated values for one or more objects in one or more web pages that could break the functionality of the web page. Additionally or alternatively, response generator 116 could include one or more errors and fail to produce the expected response state for a particular challenge state or challenge nonce and log one or more errors or perform one or more other negative actions. Accordingly, the developer reproduce the error by executing a copy of deterministic filter logic 120, challenge generator 113, request filter 115, or response generator 116 on the developer's personal computer, and causing challenge generator 113 to create modified web page 104. A browser on the personal computer may process or execute modified web page 104 and send a request that includes a test response state to request filter 115 on the personal computer. The developer may reproduce the state of request filter 115 and response generator 116, generate a response state, and reproduce the error. The developer may fix response generator 116 accordingly.

3.5 Validating the Challenge Nonce

Although the systems and method discussed herein may make attacks more difficult, an attacker could use a packet sniffer or other network monitoring tools to determine what data is being sent in a particular request that is sent by a browser after the browser processes or executes a modified web page, such as a modified web page 104. The attacker could generate multiple requests using the same challenge nonce and response state in the particular request, but change or add other data to the request. An attacker that uses this method could be shut down quickly because repetitive and frequent requests that use the same challenge nonce or response state caught or identified by one or more server administrator tools. That particular challenge nonce could be blacklisted and all request that include that challenge nonce could be dropped.

To avoid using the same challenge nonce and response state, an attacker may reverse engineer how the browser generates the response state based on the challenge state, and how the challenge state is based on the challenge nonce. Then, for each request in a plurality of requests, the attacker may generate a new challenge nonce, generate the corresponding challenge state based on the new challenge state, and generate a corresponding response state. Accordingly, when the request is sent to the server, the server may determine that the test nonce corresponds with the test response and perform a positive action.

To prevent an attacker from generating and using challenge nonces, nonce generator 112 may generate a challenge nonce that is signed or includes an authentication code or mechanism. For example, nonce generator 112 may generate a nonce and an authentication code. The authentication code may be a digital signature, message authentication code, keyed hash function, or other authentication code. The authentication code may be based on a cryptographic hashing function or one or more features, such as a secret value known by nonce generator 112, a time or timestamp generated by nonce generator 112, or one or more other values. Nonce generator 112 can append the authentication code to the nonce. Accordingly, a valid test nonce will include the authentication code created by the nonce generator. If request filter 115 receives a request with a test nonce that does not include a valid authentication code, or if the test nonce includes an invalid or expired authentication code, then request filter 115 may perform a negative action. Nonce generator 112 and request filter 115 may be updated so that the methods or data used to generate a authentication code can change over time.

4.0 Example Multi-Intermediary Computer Network Deterministically Modifying Web Pages and Validating Responses FIG. 2 illustrates a computer system comprising a web infrastructure, and two intermediary computers, which may be configured to deterministically generate or modify one or more web pages, and receive requests based on the modified web pages from one or more client computers, in an example embodiment. In FIG. 2, system 200 comprises intermediary computer 220, intermediary computer 230 web infrastructure 150, and client computer 140 distributed across one or more interconnected networks. Web page 202, modified web page 204, request 240, and request 252 are discussed in detail with regard to the process illustrated in FIG. 3 (discussed in detail further herein). While FIG. 2 illustrates two server computers that implement complex deterministic processes, other embodiments, may include more than two server computers.

Intermediary computer 220 and intermediary computer 230 are two separate intermediary computers. As discussed in detail further herein, intermediary computer 220 and intermediary computer 230 may operate independently: intermediary computer 220 may generate or modify a web page using one or more deterministic processes, and send the generated or modified web page to a client computer. Without any direct communication between intermediary computer 220 and intermediary computer 230, intermediary computer 230 may receive, from a client computer, a request that is based on a web page generated or modified by intermediary computer 220, validate the request, and perform a negative or positive action based on whether the request is validated. Accordingly, intermediary computer 220 and intermediary computer 230 need not be communicatively or operably coupled. However, in an embodiment, intermediary computer 220 and intermediary computer 230 may be communicatively coupled through one or more computer networks. For example, intermediary computer 220 and intermediary computer 230 may be two computers in the same data center or cloud computing system.

Intermediary computer 220 comprises deterministic filter logic 222, and intermediary computer 230 comprises deterministic filter logic 232. Deterministic filter logic 222 and deterministic filter logic 232 may comprise hardware or software components that perform one or more deterministic processes discussed herein. For example, deterministic filter logic 222 and deterministic filter logic 232 may each include the hardware and software components discussed deterministic filter logic 120, in FIG. 1. For example, deterministic filter logic 222 and deterministic filter logic 232 may each include a client logic module, nonce generator, challenge generator, server logic, request filter, or response generator.

5.0 Example Deterministic Processes Implemented on Multiple Server Computers FIG. 3 illustrates a process for a first server computer deterministically generating a web page, and a second server computer processing a request that was generated based on the web page without the first server computer sending data directly to the second server computer or persistently storing data related to the web page, in an example embodiment. For purposes of illustrating a clear example, assume the following:

Deterministic filter logic 222 and deterministic filter logic 232 are configured to protect web infrastructure 210 from attacks from malicious requests by implementing one or more deterministic processes into web pages received from web infrastructure 210;

Deterministic filter logic 222 received web page 202 from web infrastructure 210 in response to forwarding a request, from browser 142, for web page 202, to web infrastructure 210.

In step 310, a first server computer generates a challenge nonce. For example, deterministic filter logic 222 may pseudo-randomly generate or select challenge nonce 206 from a range of challenge nonces. As discussed herein, challenge nonce 206 may be signed or include an authentication code or mechanism.

In step 320, the first server computer generates a challenge state based on the challenge nonce, wherein the challenge state corresponds to a response state. For example, deterministic filter logic 222 may generate challenge state 208. For purposes of illustrating a clear example, assume the following:

Deterministic filter logic 222 and deterministic filter logic 232 are each configured to generate a challenge state the corresponds to a challenge nonce;

Each challenge state comprises a set of instructions, which when executed in a runtime environment, cause the runtime environment to generate a corresponding response state;

The set of instructions are a set of JavaScript instructions and the runtime environment is a JavaScript runtime environment;

The set of JavaScript instructions in each challenge state is configured to cause the JavaScript runtime environment executing the set of JavaScript instructions to: (1) define a plurality of functions; (2) directly, or indirectly, call one or more functions, among the plurality of functions, one or more times, in a particular order, based on the challenge nonce; and (3) generate, as the corresponding response state, a stack trace that indicates the particular order in which the one or more functions were called the one or more times;

Challenge state 208 comprises a set of JavaScript instructions, which when executed in a JavaScript runtime environment, generate a stack trace indicating that a first function named ABC called a second function named XYZ, which called the first function again.

In an embodiment, deterministic filter logic 222 and deterministic filter logic 232 may generate a unique challenge state for each unique challenge nonce in the range of challenge nonces. Accordingly, deterministic filter logic 222 and deterministic filter logic 232 may be configured to generate a unique challenge state for each corresponding unique challenge nonce. Each unique challenge state may include a unique set of instructions that define one or more unique functions, which when executed in a runtime environment, cause the one or more unique functions to generate a unique response state that corresponds to the unique challenge state and the corresponding unique challenge nonce. Accordingly, in the example above, each unique response state may be a unique stack trace generated by executing the instructions in the corresponding unique challenge state based on the corresponding unique challenge nonce.

In step 330, the first server computer sends, to a client computer, the challenge nonce and the challenge state. For example, deterministic filter logic 222 inserts challenge nonce 206 and challenge state 208 into web page 202 to generate modified web page 204. Deterministic filter logic 222 sends modified web page 204, to browser 142, on client computer 140.

In step 340, a second server computer receives a test nonce and a test response state. For purposes of illustrating a clear example, assume the following:
  Browser 142 includes a JavaScript runtime environment and executes the set of JavaScript instructions in challenge state 208, which generates test response state 249;
  Test response state 248 comprises a stack trace indicating that a first function named ABC called a second function named XYZ, which called the first function again;
  Browser 142 generates request 240 in response to receiving input that a user selected a link in modified web page 204;
  Request 240 includes test response state 249;
  Request 240 includes challenge nonce 206 as test nonce 246;
  Request 240 is received by a load balancer that is not illustrated in FIG. 2, which routes request 240 to deterministic filter logic 232 on intermediary computer 230.

Accordingly, deterministic filter logic 232 may receive request 240.

In step 350, the second server computer determines whether the test response state matches the response state. For purposes of illustrating a clear example, assume the following:
  Deterministic filter logic 222 and deterministic filter logic 232 each include a response generator that comprises a JavaScript runtime environment;
  Test nonce 246 is the same as challenge nonce 206, and therefore, an expected challenge state generated by deterministic filter logic 222 or deterministic filter logic 232 may be the same as challenge state 208.

Accordingly, deterministic filter logic 232 may generate an expected challenge state based on test nonce 246. For example, deterministic filter logic 232 may execute the JavaScript instructions in the expected challenge state to produce the corresponding expected response state. Since, in this example, the expected challenge state is the same as challenge state 208, then the expected response state comprises a stack trace indicating that a first function named ABC called a second function named XYZ, which called the first function again. Deterministic filter logic 232 may compare the expected response state and test response state 249. Deterministic filter logic 232 may determine that expected response state and test response state 249 match because each response state comprises a stack trace indicating that a first function named ABC called a second function named XYZ, which called the first function again. In response to determining that the expected response state and test response state 249 match, deterministic filter logic 232 may proceed to step 360 and perform a positive action, such as forwarding request 240 to web infrastructure 150 as request 252. In an embodiment, deterministic filter logic 232 may remove test nonce 246 and test response state 249 from request 252. In an embodiment, deterministic filter logic 232 may include test nonce 246, test response state 249, or challenge state 208 in request 252.

In this example, deterministic filter logic 232 is able to generate the expected response state that challenge state 208 corresponds to, which challenge nonce 206 corresponds to, because generating the challenge state is a deterministic process based on a challenge nonce, and determining a response state is a deterministic process based on the challenge state. Accordingly, deterministic filter logic 232 may generate the expected response state that corresponds with challenge state 208, which corresponds to challenge nonce 206, without one or more of the following:
  Deterministic filter logic 222 or intermediary computer 220 persistently storing challenge nonce 206;
  Deterministic filter logic 222 or intermediary computer 220 sending challenge nonce 206 directly to deterministic filter logic 232 or intermediary computer 230;
  Deterministic filter logic 232 or intermediary computer 230 receiving challenge nonce 206 directly from deterministic filter logic 222 or intermediary computer 220;
  Deterministic filter logic 222 or intermediary computer 220 persistently storing challenge state 208;
  Deterministic filter logic 222 or intermediary computer 220 sending challenge state 208 directly, or indirectly, to deterministic filter logic 232 or intermediary computer 230;
  Deterministic filter logic 232 or intermediary computer 230 receiving challenge state 208 directly, or indirectly, from deterministic filter logic 222 or intermediary computer 220;
  Browser 142 or client computer 140 persistently storing challenge state 208;
  Browser 142 or client computer 140 sending challenge state 208 directly, or indirectly, to deterministic filter logic 232 or intermediary computer 230;
  Deterministic filter logic 232 or intermediary computer 230 receiving challenge state 208 directly, or indirectly, from browser 142 or client computer 140;
  Deterministic filter logic 222 or intermediary computer 220 generating the response state that corresponds to challenge state 208;
  Deterministic filter logic 222 or intermediary computer 220 persistently storing the response state that corresponds to challenge state 208;
  Deterministic filter logic 222 or intermediary computer 220 sending the response state that corresponds to challenge state 208 directly, or indirectly, to browser 142 or client computer 140;
  Browser 142 or client computer 140 receiving the response state that corresponds to challenge state 208 directly, or indirectly, from deterministic filter logic 222 or intermediary computer 220.

In the example above, browser 142 was a browser that included the required software to execute the instructions in challenge state 208 and generate the corresponding response state. If, however, browser 142 was unable to process and execute challenge state 208 as expected by deterministic filter logic 222 or deterministic filter logic 232, then test response state 249 may be missing or different than the expected response state that corresponds to challenge state 208. Accordingly, deterministic filter logic 232 may proceed to step 370, and perform a negative action.

In an embodiment, deterministic filter logic 222 or deterministic filter logic 232 generate challenge nonces that are signed or include an authentication code or mechanism. Accordingly, challenge nonce 206, which was generated by deterministic filter logic 222, may be signed or include an authentication code or mechanism. After receiving request 240, deterministic filter logic 232 may determine if test nonce 246 is correctly signed or includes a valid authentication code or mechanism. If so, then control may proceed to step 360 and deterministic filter logic 232 may perform a positive action; otherwise, control may proceed to step 370 and perform a negative action.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

7.0 Other Aspects of Disclosure

Using the networked computer arrangements, intermediary computer(s), or processing methods described herein, security in client-server data processing may be significantly increased. Techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system, configured to improve security or performance of one or more client computers interacting with a plurality of server computers, comprising a first server computer and a second server computer;
wherein the first server computer is configured to:
  access a challenge nonce, wherein the challenge nonce corresponds to a set of JavaScript instructions;
  generate the set of JavaScript instructions based on the challenge nonce, wherein the set of JavaScript instructions corresponds to a response state;
  send, to a first client computer, the challenge nonce and the set of JavaScript instructions, but not the response state;
wherein the second server computer is configured to:
  receive, from the first client computer, a test nonce and a test response state;
  determine whether the test response state matches the response state based on the test nonce, without:
    receiving the set of JavaScript instructions from the first server computer;
    receiving the set of JavaScript instructions from the first client computer;
  wherein the challenge nonce matches the test nonce, and the second server computer is configured to:
    generate the set of JavaScript instructions based on the test nonce;
    generate the response state based on the set of JavaScript instructions.

2. The computer system of claim 1, wherein the second server computer is configured to perform a positive action in response to determining that the test response state matches the response state, wherein the positive action comprises one or more of:
  forwarding a message; or
  replacing one or more values in the message with one or more values in the response state.

3. The computer system of claim 1, wherein:
  the first server computer does not persistently store the challenge nonce;
  the first server computer does not persistently store the set of JavaScript instructions; and
  the first server computer does not generate the response state.

4. The computer system of claim 1, wherein the set of JavaScript instructions comprises a set of instructions, which when executed produces the response state.

5. The computer system of claim 4, wherein the first server computer is configured to include the set of instructions in a web page, wherein sending the set of instructions to the first client computer comprises sending the web page to the first client computer.

6. The computer system of claim 4, wherein a third server computer is configured to:
  receive, from the first client computer, an error message that includes the test nonce, wherein the test nonce is the challenge nonce;
  store the error message with the test nonce;
  receive, from a second client computer, a request for the error message and the set of instructions sent to the first client computer that caused the first client computer to send the error message, and in response, generate the set of instructions based on the test nonce, and send the set of instructions to the second client computer.

7. The computer system of claim 1, wherein the first server computer and the second server computer are configured to, for each unique nonce, among a set of unique nonces:
  generate a unique set of JavaScript instructions comprising a unique set of instructions that define one or more unique functions, which when executed, causes the one or more unique functions to generate a unique response state.

8. The computer system of claim 7, wherein, for each unique nonce among the set of unique nonces, the unique response state is a unique stack trace based on the one or more unique functions.

9. A computer system, configured to improve security or performance of one or more client computers interacting with a plurality of server computers, comprising a first server computer and a second server computer;
wherein the first server computer is configured to:
  access a challenge nonce, wherein the challenge nonce corresponds to a set of JavaScript instructions;
  generate the set of JavaScript instructions based on the challenge nonce, wherein the set of JavaScript instructions corresponds to a response state;

send, to a first client computer, the challenge nonce and the set of JavaScript instructions, but not the response state;
wherein the second server computer is configured to:
receive, from the first client computer, a test nonce and a test response state;
determine whether the test response state matches the response state based on the test nonce, without:
receiving the set of JavaScript instructions from the first server computer;
receiving the set of JavaScript instructions from the first client computer;
wherein the test nonce does not match the challenge nonce, and wherein the second server computer is configured to:
generate an expected set of JavaScript instructions based on the test nonce;
generate an expected response state based on the expected set of JavaScript instructions;
determine that the expected response state is different than the response state, and in response, determine that the test response state does not match the response state.

10. The computer system of claim 9, wherein the second server computer is configured to perform a negative action in response to determining that the test response state does not match the response state, wherein the negative action comprises one or more of:
terminating a message without forwarding the message;
storing the test nonce and an identifier for the message in an error log; or
sending a notification to a user.

11. The computer system of claim 9, wherein the test response state matches the response state.

12. The computer system of claim 9, wherein:
the first server computer does not persistently store the challenge nonce;
the first server computer does not persistently store the set of JavaScript instructions; and
the first server computer does not generate the response state.

13. The computer system of claim 9, wherein the set of JavaScript instructions comprises a set of instructions, which when executed produces the response state.

14. The computer system of claim 13, wherein the first server computer is configured to include the set of instructions in a web page, wherein sending the set of instructions to the first client computer comprises sending the web page to the first client computer.

15. The computer system of claim 13, wherein a third server computer is configured to:
receive, from the first client computer, an error message that includes the test nonce, wherein the test nonce is the challenge nonce;
store the error message with the test nonce;
receive, from a second client computer, a request for the error message and the set of instructions sent to the first client computer that caused the first client computer to send the error message, and in response, generate the set of instructions based on the test nonce, and send the set of instructions to the second client computer.

16. The computer system of claim 9, wherein the first server computer and the second server computer are configured to, for each unique nonce, among a set of unique nonces:
generate a unique set of JavaScript instructions comprising a unique set of instructions that define one or more unique functions, which when executed, causes the one or more unique functions to generate a unique response state.

17. The computer system of claim 16, wherein, for each unique nonce among the set of unique nonces, the unique response state is a unique stack trace based on the one or more unique functions.

18. A computer system comprising:
a plurality of computers coupled to one or more non-transitory computer readable media storing a set of instructions which, when executed by the plurality of computers, causes:
a first computer to:
access a challenge nonce, wherein the challenge nonce corresponds to a set of JavaScript instructions;
generate the set of JavaScript instructions based on the challenge nonce, wherein the set of JavaScript instructions corresponds to a response state;
send, to a first client computer, the challenge nonce and the set of JavaScript instructions, but not the response state;
a second computer to:
receive, from the first client computer, a test nonce and a test response state;
determine whether the test response state matches the response state based on the test nonce, without:
receiving the set of JavaScript instructions from the first computer;
receiving the set of JavaScript instructions from the first client computer;
wherein the challenge nonce matches the test nonce, and wherein the set of instructions, when executed by the plurality of computers, causes the second computer to:
generate the set of JavaScript instructions based on the test nonce;
generate the response state based on the set of JavaScript instructions.

19. The computer system of claim 18, wherein the set of instructions, when executed by the plurality of computers, causes the second computer to perform a positive action in response to determining that the test response state matches the response state, wherein the positive action comprises one or more of:
forwarding a message; or
replacing one or more values in the message with one or more values in the response state.

20. The computer system of claim 18, wherein the set of instructions, when executed by the plurality of computers, does not cause the first computer to:
persistently store the challenge nonce;
store the set of JavaScript instructions;
generate the response state.

21. The computer system of claim 18, wherein the set of JavaScript instructions comprises one or more instructions, which when executed produces the response state.

22. The computer system of claim 21, wherein the set of instructions, when executed by the plurality of computers, causes the first computer to include the one or more instructions in a web page, wherein sending the one or more instructions to the first client computer comprises sending the web page to the first client computer.

23. The computer system of claim 21, wherein the set of instructions, when executed by the plurality of computers, causes a third server computer to:

receive, from the first client computer, an error message that includes the test nonce, wherein the test nonce is the challenge nonce;
store the error message with the test nonce;
receive, from a second client computer, a request for the error message and the one or more instructions sent to the first client computer that caused the first client computer to send the error message, and in response, generate the one or more instructions based on the test nonce, and send the one or more instructions to the second client computer.

24. The computer system of claim 18, wherein the set of instructions, when executed by the plurality of computers, causes the first computer, and the second computer, to, for each unique nonce, among a set of unique nonces:
generate a unique set of JavaScript instructions comprising a unique set of instructions that define one or more unique functions, which when executed, causes the one or more unique functions to generate a unique response state.

25. The computer system of claim 24, wherein, for each unique nonce among the set of unique nonces, the unique response state is a unique stack trace based on the one or more unique functions.

26. A computer system comprising:
a plurality of computers coupled to one or more non-transitory computer readable media storing a set of instructions which, when executed by the plurality of computers, causes:
a first computer to:
access a challenge nonce, wherein the challenge nonce corresponds to a set of JavaScript instructions;
generate the set of JavaScript instructions based on the challenge nonce, wherein the set of JavaScript instructions corresponds to a response state;
send, to a first client computer, the challenge nonce and the set of JavaScript instructions, but not the response state;
a second computer to:
receive, from the first client computer, a test nonce and a test response state;
determine whether the test response state matches the response state based on the test nonce, without:
receiving the set of JavaScript instructions from the first computer;
receiving the set of JavaScript instructions from the first client computer;
wherein the test nonce does not match the challenge nonce, and wherein the set of instructions, when executed by the plurality of computers, causes the second computer to:
generate an expected set of JavaScript instructions based on the test nonce;
generate an expected response state based on the expected set of JavaScript instructions;
determine that the expected response state is different than the response state, and in response, determine that the test response state does not match the response state.

27. The computer system of claim 26, wherein the set of instructions, when executed by the plurality of computers, causes the second computer to perform a negative action in response to determining that the test response state does not match the response state, wherein the negative action comprises one or more of:
terminating a message without forwarding the message;
storing the test nonce and an identifier for the message in an error log; or
sending a notification to a user.

28. The computer system of claim 26, wherein the test response state matches the response state.

29. The computer system of claim 26, wherein the set of instructions, when executed by the plurality of computers, does not cause the first computer to:
persistently store the challenge nonce;
store the set of JavaScript instructions;
generate the response state.

30. The computer system of claim 26, wherein the set of JavaScript instructions comprises one or more instructions, which when executed produces the response state.

31. The computer system of claim 30, wherein the set of instructions, when executed by the plurality of computers, causes the first computer to include the one or more instructions in a web page, wherein sending the one or more instructions to the first client computer comprises sending the web page to the first client computer.

32. The computer system of claim 30, wherein the set of instructions, when executed by the plurality of computers, causes a third server computer to:
receive, from the first client computer, an error message that includes the test nonce, wherein the test nonce is the challenge nonce;
store the error message with the test nonce;
receive, from a second client computer, a request for the error message and the one or more instructions sent to the first client computer that caused the first client computer to send the error message, and in response, generate the one or more instructions based on the test nonce, and send the one or more instructions to the second client computer.

33. The computer system of claim 26, wherein the set of instructions, when executed by the plurality of computers, causes the first computer, and the second computer, to, for each unique nonce, among a set of unique nonces:
generate a unique set of JavaScript instructions comprising a unique set of instructions that define one or more unique functions, which when executed, causes the one or more unique functions to generate a unique response state.

34. The computer system of claim 33 wherein, for each unique nonce among the set of unique nonces, the unique response state is a unique stack trace based on the one or more unique functions.

35. A method comprising:
accessing, at a first server computer, a challenge nonce, wherein the challenge nonce corresponds to a set of JavaScript instructions;
generating, at the first server computer, the set of JavaScript instructions based on the challenge nonce, wherein the set of JavaScript instructions corresponds to a response state;
sending, from the first server computer, to a first client computer, the challenge nonce and the set of JavaScript instructions, but not the response state;
receiving, at a second server computer, from the first client computer, a test nonce and a test response state;
determining, at the second server computer, whether the test response state matches the response state based on the test nonce, without:
receiving the set of JavaScript instructions from the first server computer;

receiving the set of JavaScript instructions from the first client computer;
wherein the challenge nonce matches the test nonce;
generating, at the second server computer, the set of JavaScript instructions based on the test nonce;
generating, at the second server computer, the response state based on the set of JavaScript instructions.

36. A method comprising:
accessing, at a server computer, a challenge nonce, wherein the challenge nonce corresponds to a set of JavaScript instructions;
generating, at the server computer, the set of JavaScript instructions based on the challenge nonce, wherein the set of JavaScript instructions corresponds to a response state;
sending, from the server computer, to a first client computer, the challenge nonce and the set of JavaScript instructions, but not the response state;
receiving, at the server computer, from the first client computer, a test nonce and a test response state;
determining, at the server computer, whether the test response state matches the response state based on the test nonce, without:
    the server computer persistently storing the challenge nonce;
    the server computer persistently storing the set of JavaScript instructions;
wherein the challenge nonce matches the test nonce;
generating, at the server computer, the set of JavaScript instructions based on the test nonce;
generating, at the server computer, the response state based on the set of JavaScript instructions.

37. A method comprising:
accessing, at a first server computer, a challenge nonce, wherein the challenge nonce corresponds to a set of JavaScript instructions;
generating, at the first server computer, the set of JavaScript instructions based on the challenge nonce, wherein the set of JavaScript instructions corresponds to a response state;
sending, from the first server computer, to a first client computer, the challenge nonce and the set of JavaScript instructions, but not the response state;
receiving, at a second server computer, from the first client computer, a test nonce and a test response state;
determining, at the second server computer, whether the test response state matches the response state based on the test nonce, without:

receiving the set of JavaScript instructions from the first server computer;
receiving the set of JavaScript instructions from the first client computer;
wherein the test nonce does not match the challenge nonce;
generating, at the second server computer, an expected set of JavaScript instructions based on the test nonce;
generating, at the second server computer, an expected response state based on the expected set of JavaScript instructions;
determining, at the second server computer, that the expected response state is different than the response state, and in response, determining that the test response state does not match the response state.

38. A method comprising:
accessing, at a server computer, a challenge nonce, wherein the challenge nonce corresponds to a set of JavaScript instructions;
generating, at the server computer, the set of JavaScript instructions based on the challenge nonce, wherein the set of JavaScript instructions corresponds to a response state;
sending, from the server computer, to a first client computer, the challenge nonce and the set of JavaScript instructions, but not the response state;
receiving, at the server computer, from the first client computer, a test nonce and a test response state;
determining, at the server computer, whether the test response state matches the response state based on the test nonce, without:
    the server computer persistently storing the challenge nonce;
    the server computer persistently storing the set of JavaScript instructions;
wherein the test nonce does not match the challenge nonce;
generating, at the server computer, an expected set of JavaScript instructions based on the test nonce;
generating, at the server computer, an expected response state based on the expected set of JavaScript instructions;
determining, at the server computer, that the expected response state is different than the response state, and in response, determining that the test response state does not match the response state.

* * * * *